(12) United States Patent
Rohleder et al.

(10) Patent No.: US 6,639,175 B2
(45) Date of Patent: Oct. 28, 2003

(54) MARKING DEVICE

(75) Inventors: Dirk Rohleder, Muderahach (DE); Kurt-Michael Zimmerman, Freiburg (DE)

(73) Assignee: Z-Laser Optoelektronik GmbH (DE)

( * ) Notice: Subject to any disclaimer, the term of this patent is extended or adjusted under 35 U.S.C. 154(b) by 0 days.

(21) Appl. No.: 10/147,840

(22) Filed: May 17, 2002

(65) Prior Publication Data

US 2002/0170893 A1 Nov. 21, 2002

(51) Int. Cl.[7] .................................................. B23K 26/00
(52) U.S. Cl. .............................. 219/121.62; 219/121.68
(58) Field of Search ........................ 219/121.6, 121.62, 219/121.68, 121.69, 121.81, 121.82, 121.85

(56) References Cited

U.S. PATENT DOCUMENTS 5,130,721 A * 7/1992 Sukhman
5,801,868 A * 9/1998 Hayasaka et al.
5,965,042 A * 10/1999 Saitoh
6,080,958 A * 6/2000 Miller et al.

* cited by examiner

*Primary Examiner*—Samuel M. Heinrich
(74) *Attorney, Agent, or Firm*—Webb Ziesenheim Logsdon Orkin & Hanson, P.C.

(57) ABSTRACT

A marking device for the creation of an optical mark onto an object has a laser connected to a power supply unit to create a laser beam and a speed acquisition device for determining a positioning speed at which the laser beam follows a repetitive pattern upon the object. The power supply unit has a controlling unit connected to the speed acquisition device which controls the intensity of the laser beam based upon the positioning speed. When the positioning speed decreases the lower predetermined value, the laser beam power is reduced and, if the positioning speed decreases below a minimum positioning speed, the laser beam is switched off.

13 Claims, 3 Drawing Sheets

MARKING DEVICE

BACKGROUND OF THE INVENTION

1. Field of the Invention

The invention refers to a marking device using a laser for the creation of an optical mark or a similar kind of projection onto an object.

2. Description of Related Art

Marking devices are known and a positioning device for one such marking device may have two deviation mirrors, placed within the beam path of the laser beam. These mirrors are movably placed in a relative position to the laser and can be brought into different swiveling positions around a neutral position by a galvanometer. For a two-dimensional alignment of the laser beam onto the different parts of the surface of an object to be marked, swiveling axes of the deviation mirrors are placed across each other.

For the creation of a two-dimensional optical projection onto an object, the laser beam is directed in quick succession to the different parts of the object which lie within that part of the object's surface that is to be marked, e.g., by moving the laser beam corresponding to a scanner movement along the surface of a line or a polygon sequence. The scanning frequency of the deviation mirrors is chosen in a way that the viewer is not able to realize the movement of the laser point which is created at the laser point's point of impact on the object surface, and the human eye, because of its inertness, will get the impression of a two-dimensional image.

The marking device has proved its worth especially for users who have to optically mark on a working table—or something similar—several different parts one after the other. It is, for example, usual to optically mark at the working table of, for example, a milling machine, or a saw, those parts one after the other on which you want to place stretching elements for the fixing of a work piece. That will make it easier for the operator to position the stretching elements on the working table. If necessary, it is also possible to project with this device additionally a contour line onto the work piece. This line makes it easy to find the exact position into which the work piece has to be brought on the working table.

However, the marking device has one disadvantage. That is, the projections only have a relatively low brightness and therefore are not well visible in bright and artificially lightened rooms. Although there are marking devices which show an extended brightness of the projection because they use lasers with a much higher beam power, these marking devices have one disadvantage with respect to the formerly mentioned ones. They do not fulfill the criteria for being classified as laser class 3A according to the norm DIN EN60825-1:1997 and the corresponding international norm. According to these standards the average power density of the light, referring to a 7-mm aperture, is not to exceed a given limit. According to the safety requirements of this norm, a laser safety officer responsible for the marking device has to be appointed. But very often a safety officer with such a qualification is not available.

A device is needed to create a marking device as mentioned first which can be classified as laser class 3A but which still produces a bright projection.

SUMMARY OF THE INVENTION

The solution for this problem is, firstly, that the marking device has a feature for speed acquisition, with which the positioning speed of the laser beam can be recorded and secondly, that the power supply unit has a control unit, connected to this speed acquisition device. This control unit should switch off the laser beam in case the positioning speed of the laser beam falls below a minimum speed and/or reduces the beam power of the laser if the positioning speed of the laser beam decreases.

The invention is based on the fact that the power density of the lighting, which is an average 7-mm aperture for the classification into laser class 3A, increases if the scanning or positioning speed of the laser beam is reduced and the power density decreases if the scanning and positioning speed is raised. This means that the average power density at the 7-mm aperture is at its peak if the laser beam is not moving and meets the 7-mm aperture completely with its beam cross section. This may happen especially in the turning points of the laser beam's scanning process. The concept of the invention provides a reduction of the classification into laser class 3A problematic average power density, so that the laser beam is switched off if it falls below a given minimum scanning speed or that its beam power is at least reduced. It is therefore also possible for a beam speed which is higher or equal to the minimum scanning speed, in spite of a classifying of the marking device into laser class 3A, to operate the laser with a comparatively high beam power to make a bright projection possible. As a result, it is not necessary to appoint a laser safety officer even though a bright laser is being used. If the beam speed falls from an initial value, the beam power of the laser is reduced, which means the laser beam remains switched on but with a reduced power. As a result, a bright projection is possible, even with a low beam speed or if the laser beam is not moving, because the human eye cannot discern between a high speed, low power laser beam and a low speed, high power laser beam.

In one embodiment of the invention, the positioning device has at least a deflector which is placed in the beam path of the laser beam and which is movable relative to the laser by a positioning mechanism.

In another embodiment, the speed acquisition device is able to determine an angular speed of the deflecting element. The deflecting element can be a galvanometer mirror. This guarantees a compact and relatively inexpensive mounting of the positioning device and also permits a high positioning speed of the laser beam. The positioning device may have two deflecting elements, placed behind each other in the beam path, which are movable around two cross axes, in particular, two rectangular axes, to make a two-dimensional projection possible. It is also possible to achieve a two-dimensional projection with a single deflecting element which is movable in two directions. The positioning device may be placed to guarantee that people maintain a correct safety distance from the deflecting element(s). The positioning device may, for example, be mounted at a certain height from the building's ceiling.

In yet another embodiment, a safety zone exists with a given safety distance value in the radiation area of the laser while the marking device has a detector to detect people in the safety zone. The detector is connected to a shutoff device for the laser. If, for a positioning device with one or more movable beam deviation elements, the positioning speed of a laser point which is projected onto an object by the laser beam is inversely proportional to the distance of the object from the point where the laser beam meets the deviation element, then this guarantees that people will keep to the required safety distance while the laser is operating. The laser beam power can then be chosen in a way that the average power density of the laser beam, referring to a 7-mm aperture and for that given safety distance, will still lie within the range that makes it possible to classify the marking device into laser class 3A. The safety zone may, for example, be surrounded by a removable protecting grid, behind which the positioning device and/or the laser are placed. An electronic switch can be used as a detector which will release the laser when the protection grid is closed and block it when the grid is open. The shutoff device is preferably there to stop the power supply of the laser. The switching off device may also have a beam interrupter or some similar device which will preferably be placed in the beam path of the laser between the laser and the positioning device.

The detector may have at least a non-contact proximity sensor able to function as a movement detector. This eliminates the need for a protection grid or a similar costly and complicated device surrounding the safety zone. The movement detector can be equipped as an ultrared and/or an ultrasonic movement detector.

The device in accordance with the subject invention may have a shutoff device with a storage for a release signal. The storage may have one entry connected to a release switch or a similar release device to activate the release signal and another entry connected to the detector to cancel the release signal when it detects a person within the safety zone. The control device is adjusted in such a way that the laser beam can only be activated when the release signal is set. After a person has been detected in the safety zone, the laser beam stays switched off until it is released again manually with the release device. This provides additional protection for preventing damage to the human eye through laser radiation.

The control device should be arranged in a way that the laser beam will have a first beam power value for the first positioning speed and a second value for a second positioning speed such that the beam power will increase linearly with the positioning speed within the speed range between these two positioning speeds. By doing so, a more or less constant brightness of the projection or the projected marking can be reached independent from the deviation speed of the laser beam. The control device may be arranged in a way that the laser has a low beam power when the laser beam is not moving, and the beam power, with increasing positioning speed of the laser beam, is raised until the maximum power of the laser is reached.

Using a relatively simple speed acquisition device, the positioning speed of the laser beam may be determined from a speed controlling signal which is used to control the positioning device. It is assumed that the actual positioning speed of the laser beam is nearly identical with the speed controlling signal.

In yet another embodiment of the invention, the speed acquisition device is arranged as a measurement device and has a sensor which measures the current consumption of the positioning power mechanism and by that indirectly measures the positioning speed of the laser beam. The actual positioning speed of the laser beam can be measured by this method in a very easy way.

BRIEF DESCRIPTION OF THE DRAWINGS

The invention, along with the object and advantages thereof, will be more apparent with the consideration of the detailed description and in conjunction with the accompanying drawings in which.

DETAILED DESCRIPTION OF THE PREFERRED EMBODIMENTS

Figure 1:
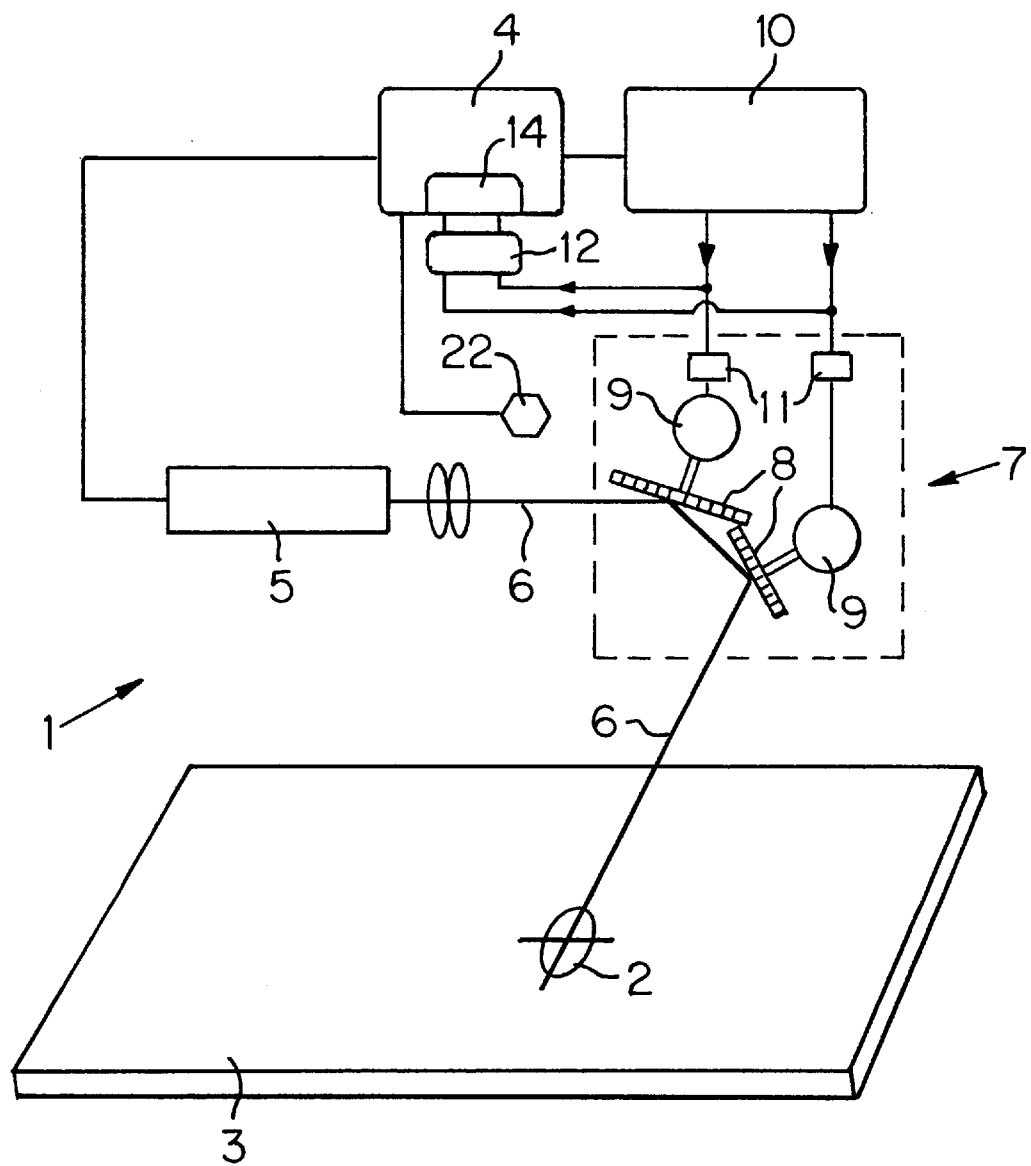
FIG. 1 is a schematic of a marking device for the creation of an optical projection on a working table.

FIG. 1 shows a marking device 1 for the creation of an optical projection 2 on an object 3, such as a working table, using a semiconductor laser 5 connected with a power supply unit 4 to produce a laser beam 6. A positioning device 7 which has two deviation elements 8 in the shape of deviation mirrors is placed in the path of the laser beam 6. The mirrors are movable through positioning mechanisms 9 in orthogonally positioned swiveling axes relatively to the laser 5. To move the optical projection 2 projected on an object by laser beam 6, the positioning device 7 is connected with a device 10 for controlling the movements of the laser beam. This movement control has a micro-computer plus an image storage for the projection but the computer is not further mentioned in the drawing. With the micro-computer, controlling signals are generated for the controlling of the positioning mechanism 9. For moving the deviation elements 8 corresponding to these control signals, the micro-computer is connected via output transformers 11 with the positioning mechanisms 9.

To acquire the positioning speed of the laser beam 6, the marking device 1 has a speed acquisition device 12, connected with the outputs of the movement control device 10, to receive the formerly mentioned control signals. For each deviation element 8, the speed acquisition device 12 has one output which receives one speed signal representing the angular speed of the corresponding deviation element 8. The speed signal has different preceding signs, depending on the swiveling direction of the deviation element 8.

Each output of the speed acquisition device 12 is connected with one input 13 of a control device 14, which represents one part of the power supply unit 4. With the control device 14 the laser beam 6 will be switched off either if a given first laser beam minimum speed value with a negative sign is exceeded or if a second given laser beam minimum speed value with a positive sign is not reached.

Figure 2:
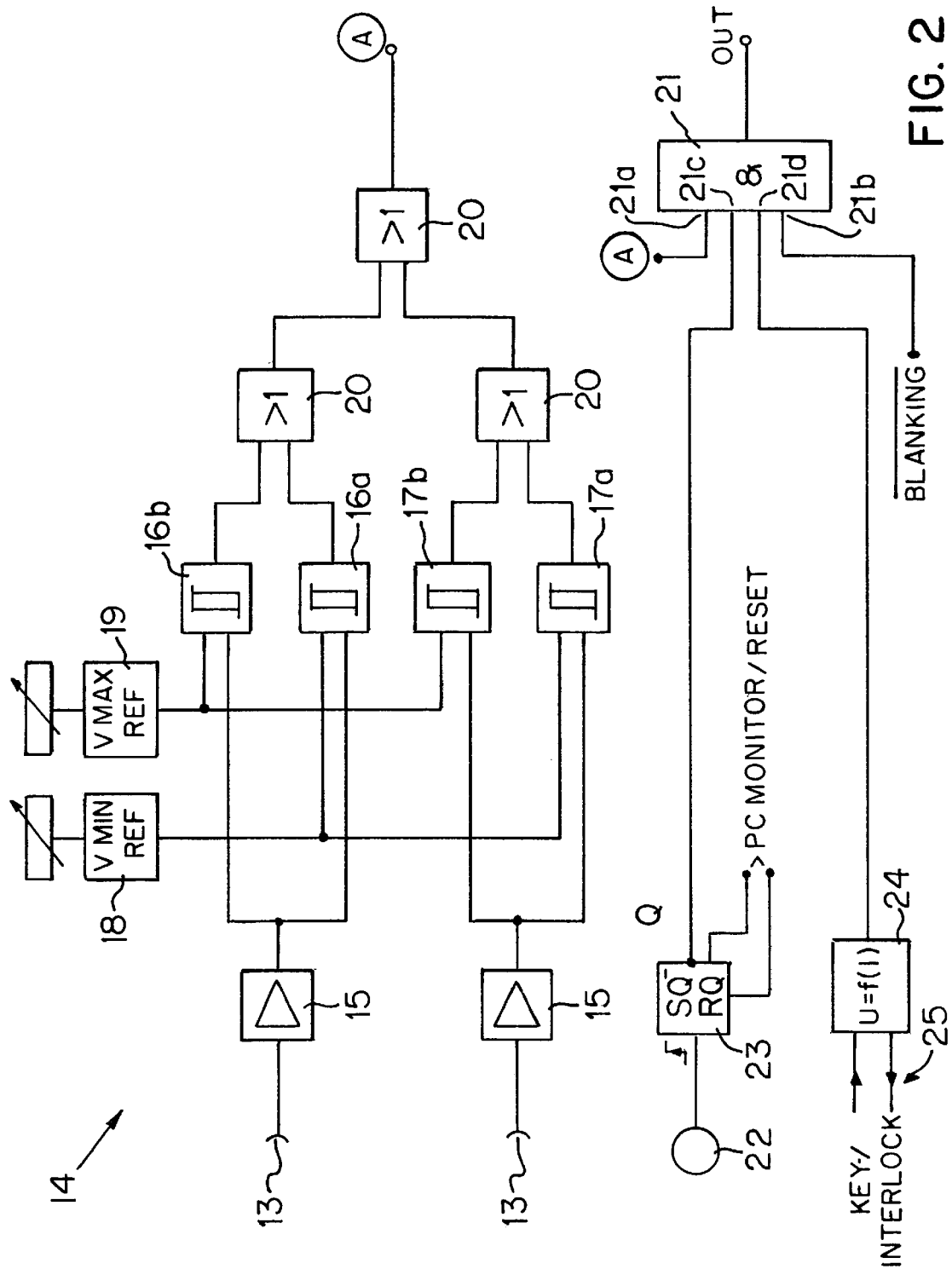
FIG. 2 is a wiring diagram of a controlling device for switching off the marking device's laser beam in case a required laser beam positioning speed is not reached.

As seen in FIG. 2, the inputs 13 for the speed signals of the two deviation elements 8 are additionally connected via an amplifier 15 with a first input of one first comparator 16a, 17a and with a first entry of a second comparator 16b, 17b. A second input of the first comparators 16a, 17a is connected to the output of a first reference element 18 to provide a first reference signal representing the first laser beam minimum positioning speed value with a negative sign. In the same way a second input of the second comparators 16b, 17b is connected with the output of a second reference element 19, to provide a second reference signal representing the positive second laser beam minimum positioning speed value. The reference speed values are adjustable with an adjusting element.

The outputs of the comparators 16a, 16b, 17a, 17b are linked via an OR-gate 20 to an intermediate signal A, which is guided to the first entry 21a of an AND-gate 21. A second input 21b of this AND-gate 21 is connected to the output for a dark touch signal of the movement control device 10. With that dark touch signal the laser beam 6 can be recognized in the dark when you are positioning the beam on places of the object 3 which are not to be illuminated. The power supply for the laser 5 is controlled via the signal that is next to the exit of the AND-gate 21.

The radiation area of the laser 5 defines a safety zone which is controlled by a detector 22, arranged as an ultrared movement detector. The detector detects people who move or stay within the safety zone and who do not maintain a required safety distance from the positioning device 7. The signal output of the detector 22 is connected to the set-input of an R/S storage 23. To switch off the laser beam 6 upon detecting a person, the storage 23 is connected with its inverting storage output Q to a third input 21c of the AND-gate 21. A non-inverting storage output is connected to an alarm monitor, which is not further mentioned in the drawing, to signal if there are people within the safety zone. A setback-input R, which is connected to a release device which is not further mentioned in the drawing, may be used to reset the storage 23. If a person is detected within the safety zone, the laser beam 6 is switched off or the switching-on of the laser beam 6 is blocked. The laser beam 6 will be switched off until the switching-on is allowed manually through the release device.

As a safety precaution, the housing of laser 5 and positioning device 7 have associated with them a detector 24 which has a current loop 25. The exit of this detector 24 is connected to a fourth input 21d of the AND-gate 21. When the housing is open the laser will be switched off or the switching-on of the laser 6 is blocked.

Figure 3:
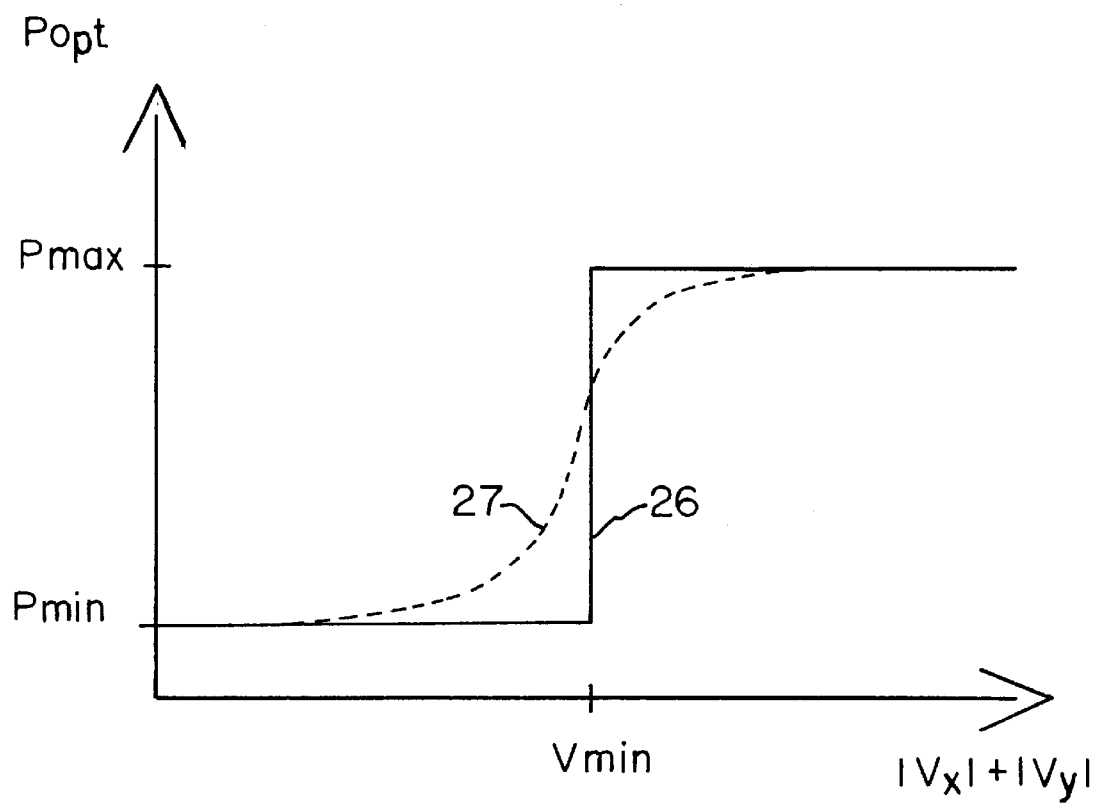
FIG. 3 is a graphic outline of the laser beam power as a function of the amount of the angular speed of the laser beam for a two-point control (continuous line) and a continuing control (punctuated line) of the laser beam power. The laser beam power $P_{opt}$ is presented on the abscissa and the laser beam's angular speed v is presented on the ordinate.

FIG. 3 shows, for two additional embodiments of the subject invention, a graphic outline of the laser beam power as a function of the angular speed of the laser beam 6. When the laser beam 6 is not moving, i.e., the angular speed v of the laser beam 6 is zero, the laser 5 will be controlled in a way that the laser beam 6 shows a first low average beam power $P_{min}$. If the amount of the positioning speed exceeds the positioning speed value, identified in the drawing as $V_{min}$, the laser 5 will be, as seen in the example in FIG. 3 with the continuous line marked as number 26, controlled such that the laser beam 6 shows approximately its maximum permitted permanent beam power $P_{max}$. In the example with the dotted line marked as number 27, the laser beam power is, with an increasing angular speed, continuously raised up to the maximum permitted permanent beam power $P_{max}$. There the rise of the laser beam power, beginning from zero, will first increase up to a maximum value and will then fall again with a further increase of the angular speed. The most significant change of the laser beam power will be within the zone of the angular speed $V_{min}$.

The subject invention need not be limited to use of a marking device but could also be any kind of laser projector, which may be used, for example, as well for entertainment or commercial purposes, such as a laser show.

Additionally, the proximity sensor is not limited to a motion detector, but could also be a permanent laser distance measurement device, or both. A laser beam would not only project but could also measure for safety purposes the distance to the projected object's surface, whether it be a work piece or human being. An integral measuring or a phase displacement measuring device would also be possible. Therefore, in accordance with the subject invention, if the object is less than a minimum distance, which is characterized by the desired laser class such as class 2 or 3A, then the device will respond by:

a) increasing the positioning speed;
b) reducing the laser power; or
c) interrupting the laser power.

The detector 22 may be a light sensor which measures the ambient brightness. For a high ambient brightness, the projection 2 may not be clearly visible on the surface of the object 3. As a result, the control device 14 will increase the laser power but without exceeding the desired laser protection class, e.g., 2 or 3A.

The integrated detector 22 measures the laser light, which is diffused and reflects back from the surface of the object 3. When there is a strong back reflection, then the laser power is lowered by the control device 14, which means that the object 3 reflects the laser light and the optical projection 2 remains clearly visible. When there is not much back reflection, for example, when material such as rubber absorbs a great amount of the laser light, then the control unit increases the laser power to the adjusted laser protection class.

Although this invention has been described with certain embodiments, various modifications, revisions and additions will become evident to persons of ordinary skill in the art. All such modifications, revisions and additions are intended to be encompassed in the scope of this invention, which is limited only by the claims appended hereto.

The invention claimed is:

1. A marking device for the creation of an optical mark onto an object, wherein the device is comprised of:
   a) a laser connected to a power supply unit to create a laser beam;
   b) a positioning device for positioning the laser beam upon the object;
   c) a position control device for controlling the positioning device to project the laser beam in a repeating pattern upon the object at a scanning frequency;
   d) a speed acquisition device for determining a positioning speed at which the laser beam follows the repeating pattern; and
   e) a controlling unit for the power supply unit, wherein the controlling unit is connected to the speed acquisition device and wherein the controlling unit controls the intensity of the laser beam based upon the positioning speed.

2. The marking device according to claim 1, wherein the controlling unit switches off the laser beam when the positioning speed falls below a minimum positioning speed and reduces the laser beam power when the positioning speed decreases from a predetermined value.

3. The marking device according to claim 1, wherein the positioning device has at least one deviation element placed in the beam path of the laser beam and movable relative to the laser by the position control device and wherein the speed acquisition device is equipped to determine the angular speed of the deviation element.

4. The marking device according to claim 1, further including a detector with a shutoff device activated to switch off the laser when a person enters a predefined safety zone proximate to the laser.

5. The marking device according to claim 4, wherein the detector has a non-contact proximity sensor.

6. The marking device according to claim 5, wherein the sensor is a motion sensor.

7. The marking device according to claim 5, wherein the shutoff device has a storage for a release signal and wherein the storage has a set input, connected to the release signal, to activate the release signal and a setback input, connected with the detector, to block the release signal when a person is detected within the safety zone, and wherein the controlling device will reactivate the laser beam only when the release signal is set.

8. The marking device according to claim 1, wherein the controlling device is equipped such that the laser beam intensity is set at a first beam power value for a first positioning speed and a second beam power value for a second positioning speed, and wherein the beam power increases approximately linearly with the positioning speed within the area that lies between these positioning speeds.

9. The marking device according to claim 1, wherein the speed acquisition device is equipped with a measuring device and has a sensor which measures the current consumption of the positioning device for the indirect measurement of the positioning speed of the laser beam.

10. The marking device according to claim 1 further comprising a light sensor to measure the ambient brightness of the laser beam reflected from the surface upon which the beam is directed.

11. The marking device according to claim 10, wherein the light sensor communicates with the controlling unit to adjust the intensity of the laser beam based upon the light reflected from the surface by the laser beam.

12. The marking device according to claim 1, wherein the laser may be used for entertainment purposes such as a laser show.

13. The marking device according to claim 1 further comprising a measuring device associated with the laser beam to enable the laser beam to both project an image upon a surface and to determine the distance between the measuring device and the surface.

* * * * *

UNITED STATES PATENT AND TRADEMARK OFFICE
CERTIFICATE OF CORRECTION

PATENT NO.    : 6,639,175 B2
DATED         : October 28, 2003
INVENTOR(S)   : Dirk Rohleder et al.

It is certified that error appears in the above-identified patent and that said Letters Patent is hereby corrected as shown below:

<u>Title page,</u>
Item [30], Foreign Application Priority Data, insert -- May 18, 2001   DE 201 08 393.0 --.

<u>Column 4,</u>
Line 66, "21 a" should read -- 21a --.

Signed and Sealed this

Eleventh Day of May, 2004

JON W. DUDAS
*Acting Director of the United States Patent and Trademark Office*